US012613009B2

(12) United States Patent
Okawachi et al.

(10) Patent No.: US 12,613,009 B2

(45) Date of Patent: Apr. 28, 2026

(54) TANK VALVE DEVICE

(71) Applicants: TOYOTA JIDOSHA KABUSHIKI KAISHA, Toyota (JP); KAWASAKI JUKOGYO KABUSHIKI KAISHA, Kobe (JP)

(72) Inventors: Eiji Okawachi, Toyota (JP); Yutaka Hotta, Toyota (JP); Masayoshi Okamoto, Kobe (JP); Makoto Ninomiya, Kobe (JP); Masashi Harada, Kobe (JP); Ryo Miyoshi, Kobe (JP)

(73) Assignees: TOYOTA JIDOSHA KABUSHIKI KAISHA, Toyota (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/551,853

(22) PCT Filed: Mar. 22, 2022

(86) PCT No.: PCT/JP2022/013104

§ 371 (c)(1),
(2) Date: Sep. 21, 2023

(87) PCT Pub. No.: WO2022/202796

PCT Pub. Date: Sep. 29, 2022

(65) Prior Publication Data

US 2024/0175551 A1 May 30, 2024

(30) Foreign Application Priority Data

Mar. 23, 2021 (JP) ................................. 2021-049054

(51) Int. Cl.
*F17C 13/02* (2006.01)
*F17C 13/04* (2006.01)

(52) U.S. Cl.
CPC ............ *F17C 13/026* (2013.01); *F17C 13/04* (2013.01); *F17C 2205/0335* (2013.01);
(Continued)

(58) Field of Classification Search
CPC .................... F17C 13/026; F17C 13/04; F17C 2205/0335; F17C 2205/0382;
(Continued)

(56) References Cited

U.S. PATENT DOCUMENTS 3,261,382 A * 7/1966 Ensign .................... F16K 21/18 141/207
3,726,187 A * 4/1973 Lewis ................. F15B 15/1447 92/108

(Continued)

FOREIGN PATENT DOCUMENTS

CN 104204650 A 12/2014
JP 2007333216 A 12/2007

(Continued)

*Primary Examiner* — Christopher M Afful
(74) *Attorney, Agent, or Firm* — Alleman Hall & Tuttle LLP

(57) ABSTRACT

A tank valve device has a valve block provided in an opening of a tank, a valve that is attached to the valve block, a nozzle head that extends along an axial line and is attached to the valve block and arranged inside the tank, and a temperature sensor that measures fluid temperature in the tank, and the nozzle head has a filling line that flows fluid to be filled into the tank, and the temperature sensor is inserted through the nozzle head.

8 Claims, 7 Drawing Sheets

(52) U.S. Cl.
CPC ................. *F17C 2205/0382* (2013.01); *F17C 2205/0391* (2013.01); *F17C 2250/0439* (2013.01); *F17C 2250/0636* (2013.01); *F17C 2260/01* (2013.01)

(58) Field of Classification Search
CPC ...... F17C 2205/0391; F17C 2250/0439; F17C 2250/0636; F17C 2260/01
USPC ............................................................ 141/94
See application file for complete search history.

(56) References Cited

U.S. PATENT DOCUMENTS

| | | | | |
|---|---|---|---|---|
| 2002/0148530 | A1* | 10/2002 | Caparros | B65D 90/48 141/86 |
| 2009/0223838 | A1* | 9/2009 | Tseng | F17C 13/00 206/0.6 |
| 2009/0236551 | A1* | 9/2009 | Nomichi | F17C 13/04 137/79 |
| 2014/0352817 | A1* | 12/2014 | Suzuki | F17C 13/04 137/550 |
| 2015/0362383 | A1 | 12/2015 | Komiya et al. | |
| 2016/0137056 | A1* | 5/2016 | Komiya | B60K 15/04 220/581 |
| 2017/0248975 | A1* | 8/2017 | Mortensen | F17C 5/06 |

FOREIGN PATENT DOCUMENTS

| | | | |
|---|---|---|---|
| JP | 2009144831 | A | 7/2009 |
| JP | 2009168166 | A | 7/2009 |
| JP | 201364440 | A | 4/2013 |
| JP | 2019190523 | A | 10/2019 |

* cited by examiner

TANK VALVE DEVICE

TECHNICAL FIELD

The present invention relates to a tank valve device provided in an opening of a tank.

BACKGROUND ART

As a tank valve device provided in an opening of a tank, a tank valve of PTL 1 is known. The tank valve of PTL 1 has a pipe that ejects fluid into the tank, and a temperature sensor that measures fluid temperature in the tank. Also, the pipe and the temperature sensor are fixed by a fixing member to disable relative displacement so that the pipe and the temperature sensor do not come into contact with each other.

CITATION LIST

Patent Literature

PTL 1: Japanese Laid-Open Patent Application Publication No. 2019-190523

SUMMARY OF INVENTION

Technical Problem

In the tank valve of PTL 1, the pipe and the temperature sensor are fixed by the fixing member to disable relative displacement. However, further reduction in the number of parts is required for the tank valve.

In light of this, it is an object of the present invention to provide a tank valve device capable of reducing the number of parts.

Solution to Problem

A tank valve device of the present invention has a valve block provided in an opening of a tank, a valve that is attached to the valve block, a nozzle head that extends along an axial line and is attached to the valve block and arranged inside the tank, and a temperature sensor that measures fluid temperature in the tank, and the nozzle head has a filling line that flows fluid to be filled into the tank, and the temperature sensor is inserted through the nozzle head.

According to the present invention, since the temperature sensor is incorporated into the nozzle head, it is possible to reduce the number of parts.

Advantageous Effects of Invention

According to the present invention, it is possible to prevent increase in the number of parts.

The above object, other objects, features, and merits of the present invention will be apparent from the following detailed description of preferred embodiments with reference to attached drawings.

DESCRIPTION OF EMBODIMENTS

Hereinafter, tank valve devices 1, 1A of Embodiment 1 and Embodiment 2 according to the present invention are described by referring to the aforementioned drawings. The concept of the direction used in the following description is merely used for convenience in description, and should not be understood to limit the orientation or the like of the configuration of the invention to the described direction. The tank valve device 1, 1A described below each are merely one embodiment of the present invention. Therefore, the present invention is not limited to the embodiments, and addition, deletion, and modification can be made without departing from the scope of the invention.

Embodiment 1

Figure 1:
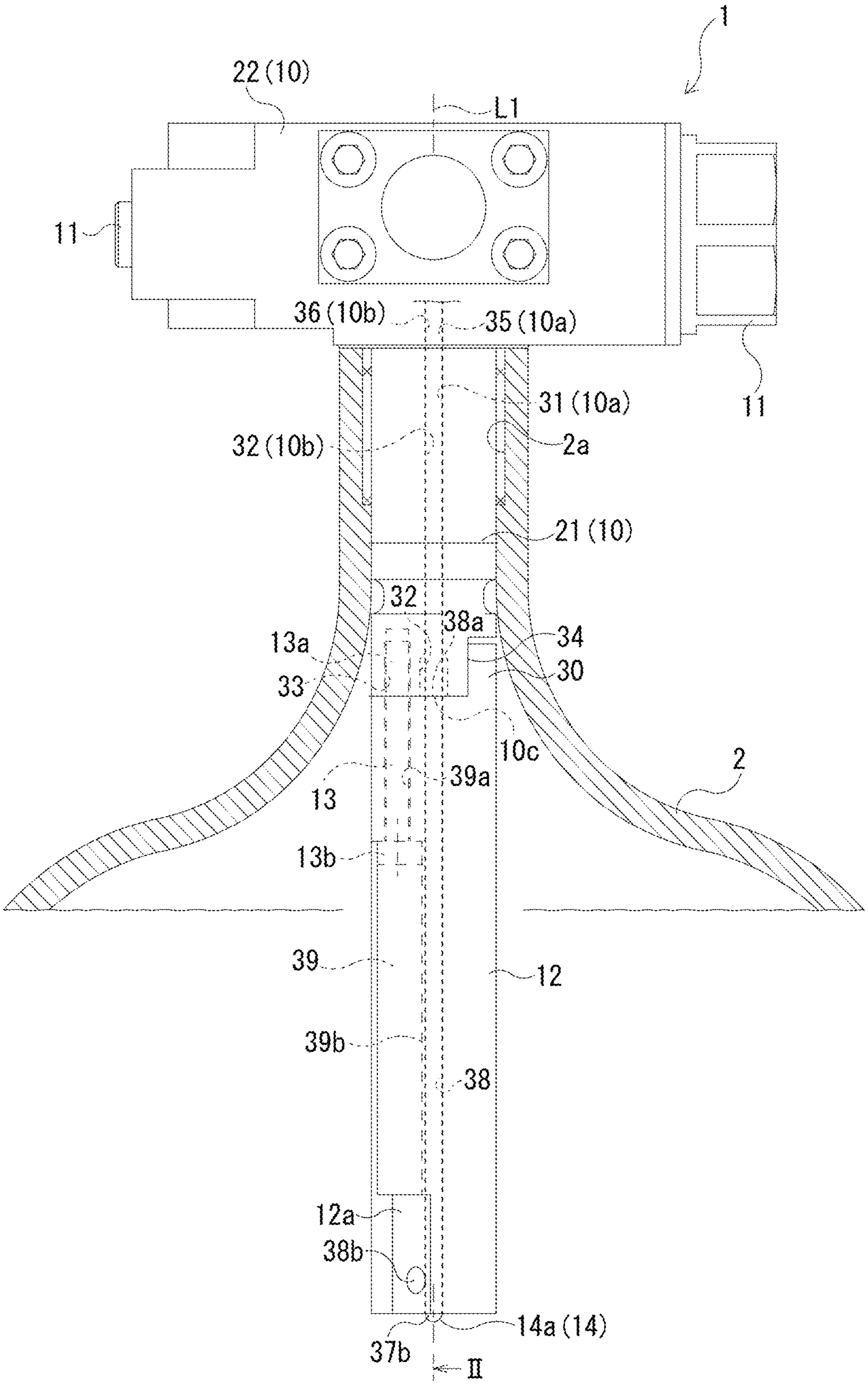
FIG. 1 is a front view showing a tank valve device according to Embodiment 1 of the present invention.
Figure 2:
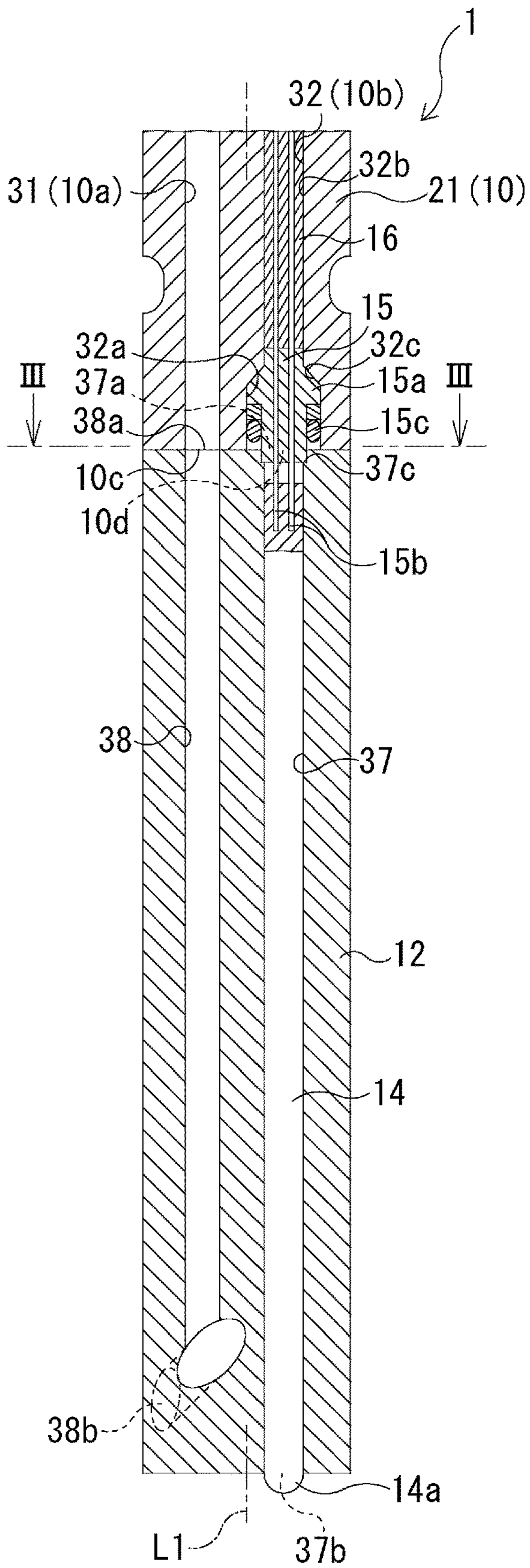
FIG. 2 is a sectional view of the tank valve device of FIG. 1 cut along the cutting line II-II.

A tank 2 as shown in FIG. 1 is capable of reserving fluid. In the present embodiment, the fluid is gas. The tank 2 is provided with the tank valve device 1. As shown in FIG. 1 and FIG. 2, the tank valve device 1 of Embodiment 1 includes a valve block 10, an electromagnetic valve 11, a nozzle head 12, a fastening member 13, a temperature sensor 14, a hermetic terminal 15, and wiring 16. The tank valve device 1 seals an opening 2*a* of the tank 2. Thus, the tank 2 is hermetically sealed. The tank valve device 1 is, for example, an on-tank type tank valve device. The tank valve device 1 is capable of filling fluid into the tank 2. Further, the tank valve device 1 is capable of delivering fluid from the tank 2.

Valve Block

The valve block 10 is a member that extends in a predetermined direction, namely, in a direction along a predetermined axial line L1. The valve block 10 has a plug portion 21, and a block body 22. In the valve block 10, a flow channel 10*a* and a wiring passage 10*b* are formed as shown in FIG. 2. A part of the valve block 10 is inserted through the opening 2*a* of the tank 2 as shown in FIG. 1. Thus, the opening 2*a* is sealed by the valve block 10. A part of valve block 10 (later-described block body 22) protrudes outward from the opening 2*a*.

The flow channel 10*a* is a flow channel that fills fluid into the tank 2 and discharges fluid in the tank 2. More specifically, the flow channel 10*a* has an inlet/outlet that is not shown. The flow channel 10*a* connects to the outside of the tank 2 via the inlet/outlet. The flow channel 10*a* has a communication port 10*c* located inside the tank 2. The flow channel 10*a* allows fluid to move between the inlet/outlet and the communication port 10*c*.

The wiring passage 10*b* is a passage that passes the wiring 16. More specifically, the wiring passage 10*b* has an extraction port that is not shown. The wiring passage 10*b* connects to the outside of the tank 2 via the extraction port. The wiring passage 10*b* has a connection port 10*d* located inside the tank 2. Thus, the wiring passage 10*b* connects inside and outside the tank 2.

The plug portion 21 has a plug-side flow channel 31 which is a part of the flow channel 10*a*, a plug-side passage 32 which is a part of the wiring passage 10*b*, a block-side engaging portion 34, and a fastening hole 33. The plug portion 21 is a portion that extends along the axial line L1 and is inserted into the opening 2*a*. More specifically, the plug portion 21 is a portion that is screwed with the opening 2*a*. The plug portion 21 is sealed against the opening 2*a*. The plug portion 21 is formed into a circular cylindrical shape in the present embodiment and extends in a predetermined direction.

The plug-side flow channel 31 extends in a predetermined direction, namely, in an axial direction in which the axial line L1 of the plug portion 21 extends. More specifically, the plug-side flow channel 31 has the communication port 10*c* in one end in the axial direction. The plug-side flow channel 31 reaches the block body 22.

The plug-side passage 32 also extends in the axial direction. More specifically, the plug-side passage 32 has the connection port 10*d* in one end in the axial direction. The plug-side passage 32 also reaches the block body 22. The plug-side passage 32 has an accommodating portion 32 on one end side in the axial direction including the connection port 10*d*. The accommodating portion 32*a* is formed to have a larger diameter than a communicating portion 32*b* located on the other end side in the axial direction of the accommodating portion 32*a*. Between the accommodating portion 32*a* and the communicating portion 32*b*, a seating portion 32*c* is formed. As one example, the seating portion 32*c* is formed to be tapered from the accommodating portion 32*a* toward the communicating portion 32*b*.

Figure 3:
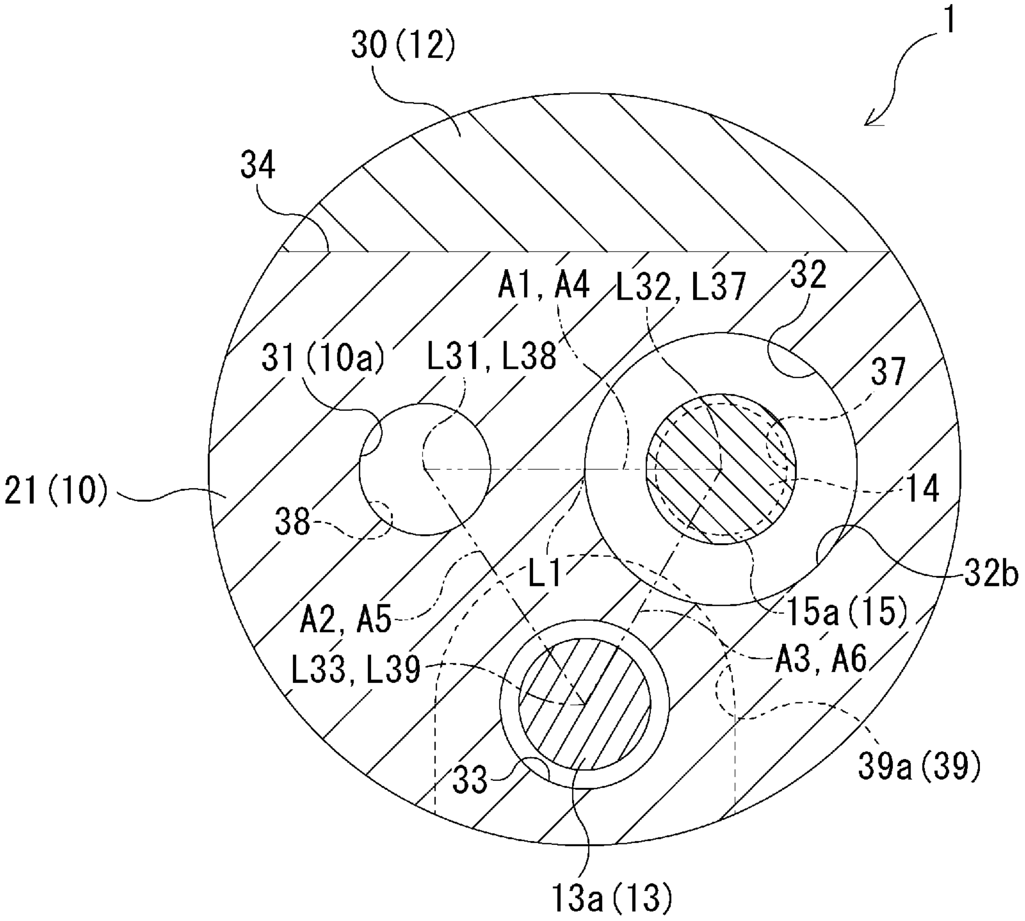
FIG. 3 is a sectional view of the tank valve device cut along the cutting line III-III of FIG. 2.

Further, the plug-side passage 32 is arranged in the following manner in the cross section of the plug portion 21 cut perpendicularly to the axial line L1 as shown in FIG. 3. That is, the plug-side passage 32 is arranged such that a straight line A1 connecting an axial line L32 of the plug-side passage 32 and an axial line L31 of the plug-side flow channel 31 (alternate long and short dash line in FIG. 3) intersects with the axial line L1. In the present embodiment, the plug-side passage 32 is arranged such that the straight line A1 intersects with the axial line L1. Further, the plug-side passage 32 is located opposite to the plug-side flow channel 31 with respect to the axial line L1. Accordingly, the plug-side passage 32 can be arranged apart from the plug-side flow channel 31. This makes it possible to ensure the strength of the plug portion 21 while preventing increase in the outer diameter of the plug portion 21. Therefore, it is possible to reduce the outer diameter of the plug portion 21.

The block-side engaging portion 34 is formed in one end part in the axial direction of the plug portion 21. The block-side engaging portion 34 is, for example, a recess portion formed in one end part in the axial direction of the plug portion 21. In the present embodiment, the block-side engaging portion 34 is formed by cutting out one end part in the axial direction in an arc form when axially viewed. The block-side engaging portion 34 is formed at such a position that it does not overlap with the straight line A1 connecting the axial lines L31 and L32. In the present embodiment, the block-side engaging portion 34 is arranged such that the part corresponding to the chord of the arc form is parallel with the straight line A1. This makes it possible to ensure the strength of the plug portion 21.

The fastening hole 33 is a hole into which the fastening member 13 is inserted as shown in FIG. 1. In the present embodiment, the fastening member 13 is screwed with the fastening hole 33. More specifically, the fastening hole 33 is open at one end in the axial direction of the plug portion 21. The fastening hole 33 extends in the axial direction so as to be parallel with the plug-side flow channel 31 and the plug-side passage 32. The fastening hole 33 is formed at such a position that it does not overlap with the straight line A1 in the cross section cut perpendicularly to the axial line L1 as shown in FIG. 3. In the present embodiment, the fastening hole 33 is arranged opposite to the block-side engaging portion 34 with respect to the straight line A1. The fastening hole 33 is arranged such that straight lines A2, A3 respectively connecting the axial lines L31, L32 and an axial line L33 of the fastening hole 33, and the straight line A1 form a triangle in the cross section cut perpendicularly to axial line L1.

The block body 22 is a part protruding from the opening 2*a* in the valve block 10 as shown in FIG. 1. That is, the block body 22 is arranged outward from the tank 2. In the block body 22, a body-side flow channel 35 which is a part of the flow channel 10*a* and a body-side passage 36 which is a part of the wiring passage 10*b* are formed. One end of the body-side flow channel 35 connects to the plug-side flow channel 31. At the other end of the body-side flow channel 35, the inlet/outlet (not shown) described above is formed. One end of the body-side passage 36 connects to the plug-side passage 32. At the other end of the body-side passage 36, the extraction port (not shown) described above is formed.

Electromagnetic Valve

The electromagnetic valve 11 is provided in the block body 22. More specifically, the electromagnetic valve 11 is provided in such a manner that it sticks a lateral surface of the block body 22, and arranged outside the tank 2. The electromagnetic valve 11 is interposed in the body-side flow channel 35. The electromagnetic valve 11 opens or closes the body-side flow channel 35 depending on the input signal. More specifically, the electromagnetic valve 11 has a valve body and a solenoid. By inputting a signal to the solenoid, the valve body moves. Thus, the electromagnetic valve 11 opens or closes the body-side flow channel 35.

Nozzle Head

Figure 4:
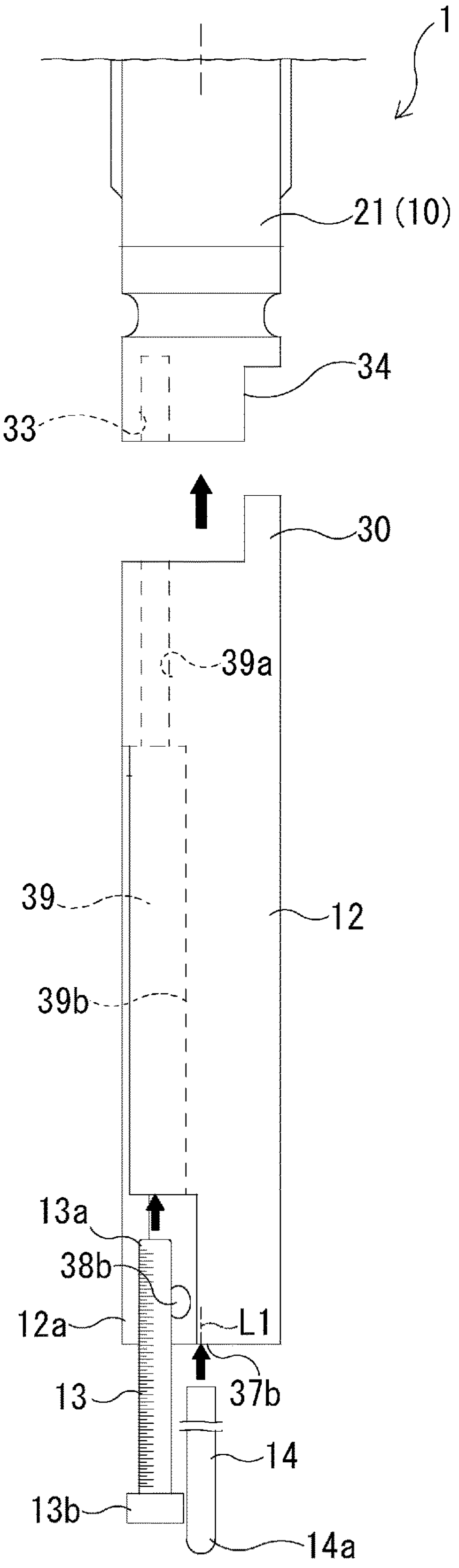
FIG. 4 is a front exploded view showing the tank valve device of FIG. 1 in an exploded manner.

The nozzle head 12 has a sensor insertion hole 37, a filling and supplying line 38, a fastening member insertion hole 39, and a head-side engaging portion 30. The nozzle head 12 is formed separately from the valve block 10 as shown also in FIG. 4. The nozzle head 12 extends along the axial line L1. Further, the nozzle head 12 is attached to the valve block 10 and arranged inside the tank 2. More specifically, the nozzle head 12 is formed into a circular cylindrical shape. In the present embodiment, the nozzle head 12 is formed to have a smaller diameter and have a larger length in the axial direction than the screw portion of the plug portion 21. However, the nozzle head 12 is not necessarily longer in the axial direction than the plug 21. In the nozzle head 12, a later-described ejection port 38*b* is formed on one end side in the axial direction. Hereinafter, regarding a member extending in the axial direction, the end face near the tank center is referred to as one end, and the end face on the opposite side is referred to as the other end. The nozzle head 12 is attached to the valve block 10 in such a manner that the other end in the axial direction faces one end in the axial direction of the plug portion 21 as shown in FIG. 1 and FIG. 2. In the present embodiment, the nozzle head 12 and the valve block 10 are arranged such that they are butted each other at a predetermined position where the respective axial lines coincide with the axial line L1. One end part in the axial direction of the nozzle head 12 is cut out into an arc form when axially viewed. Thus, a flat cut-out face 12*a* extending in the axial direction is formed on the circumferential face of the one end part in the axial direction of the nozzle head 12.

The sensor insertion hole 37 which is an insertion hole has a connection port 37*a*, an insertion port 37*b*, and a step portion 37*c*. The sensor insertion hole 37 is a hole extending linearly in the nozzle head 12, and is a hole through which the temperature sensor 14 is inserted. More specifically, the sensor insertion hole 37 extends in the axial direction. The sensor insertion hole 37 is formed apart from the axial line L1 in the radial direction. The sensor insertion hole 37 is arranged in correspondence with the plug-side passage 32.

The connection port 37*a* is formed at the other end of the nozzle head 12. The connection port 37*a* connects to the connection port 10*d* of the plug-side passage 32 when the nozzle head 12 and the valve block 10 are butted each other at a predetermined position. The insertion port 37*a* is formed at one end of the nozzle head 12. The insertion port 37*a* is oriented toward the center of the tank 2. The step portion 37*c* is formed in the vicinity of the connection port 10*d* in the sensor insertion hole 37. The sensor insertion hole 37 is formed such that the part of the connection port 37*a* side from the step portion 37*c* has a larger diameter than the part of the opposite side (namely, the part of the insertion port 37*a* side from the step portion 37*c*).

The filling and supplying line 38 has a communication port 38*a* and the ejection port 38*b*. The filling and supplying line 38 is a filling line that guides fluid guided to the flow channel 10*a* inside the tank 2. The filling and supplying line 38 also serves as a supplying line that delivers fluid in the tank 2 to the flow channel 10*a*. The filling and supplying line 38 extends in the axial direction so as to be parallel with the sensor insertion hole 37 as shown in FIG. 2. The filling and supplying line 38 is arranged in correspondence with the plug-side flow channel 31.

The communication port 38*a* is formed at the other end of the nozzle head 12. The communication port 38*a* connects to the communication port 10*c* of the plug-side flow channel 31 when the nozzle head 12 and the valve block 10 are butted each other at a predetermined position. Therefore, likewise the plug-side passage 32 and the plug-side flow channel 31, the sensor insertion hole 37 and the filling and supplying line 38 are arranged such that a straight line A4 connecting respective axial lines L37 and L38 (alternate long and short dash line in FIG. 3) passes through the axial line L1.

The ejection port 38*b* is formed on one end side of the nozzle head 12. The ejection port 38*b* ejects fluid into the tank 2. More specifically, the ejection port 38*b* is oriented to the direction away from the sensor insertion hole 37. In the present embodiment, a part of one end side of the filling and supplying line 38 is inclined outwardly in the radial direction to separate from the sensor insertion port 37 as the part advances to the one end side of the nozzle head 12. The ejection port 38*b* is formed on the cut-out surface 12*a* of the nozzle head 12. Further, the filling and supplying line 38 is so provided that the virtual line extended in the ejecting direction from the axial line of the ejection port 38*b* does not intersect with the insertion port 37*b* of the sensor insertion hole 37. That is, the filling and supplying line 38 is formed so that the insertion port 37*b* is not arranged on the extension of the ejecting direction of the ejection port 38*b*.

The fastening member insertion hole 39 has an insertion portion 39*a* and a counterbore portion 39*b*. The fastening member insertion hole 39 is a hole through which the fastening member 13 is inserted. The fastening member insertion hole 39 extends in the axial direction so as to be parallel with the sensor insertion hole 37 and the filling and supplying line 38. The fastening member insertion hole 39 penetrates the nozzle head 12. The fastening member insertion hole 39 is only required to penetrate the nozzle head 12 by at least one part, and does not necessarily penetrate the nozzle head 12 by the whole. The fastening member insertion hole 39 is arranged in correspondence with the fastening hole 33. More specifically, the fastening member insertion hole 39 is open at the other end of the nozzle head 12. The fastening member insertion hole 39 connects to the fastening hole 33 when the nozzle head 12 and the valve block 10 are butted each other at a predetermined position. Likewise the fastening hole 33, the fastening member insertion hole 39 is also formed at such a position that it does not overlap with the straight line A4. In the present embodiment, the fastening member insertion hole 39 is arranged on the ejection port 38*b* side with respect to the straight line A4. Further, the fastening member insertion hole 39 is arranged such that straight lines A5, A6 respectively connecting the axial lines L37, L38 and an axial line L39 of the fastening member insertion hole 39, and the straight line A4 form a triangle in the cross section cut perpendicularly to the axial line L1.

The insertion portion 39*a* is formed on the other end side of the nozzle head 12. The insertion portion 39*a* is open at the other end of the nozzle head 12. Therefore, when the nozzle head 12 and the valve block 10 are butted each other at a predetermined position, the insertion portion 39*a* connects to the fastening hole 33. More specifically, the insertion portion 39*a* has a circular cross section, and extends in the axial direction. That is, the insertion portion 39*a* extends along the axial line L39 of the fastening member insertion hole 39.

The counterbore portion 39*b* is formed in an intermediate part of the nozzle head 12 with respect to the insertion portion 39*a*. More specifically, the counterbore portion 39*b* extends along the axial line L39, and is a groove formed by axially cutting out the circumferential face of the nozzle head 12. That is, the counterbore portion 39*b* is formed in a U-shape when viewed axially. The counterbore portion 39*b* extends from one end of the nozzle head 12 to the insertion portion 39*a*. The width of the counterbore portion 39*b* is formed to be larger than the hole diameter of the fastening member insertion hole 39.

The head-side engaging portion 30 is formed to be engageable with the block-side engaging portion 34. More specifically, the head-side engaging portion 30 is formed at the other end of the nozzle head 12 in correspondence with the block-side engaging portion 34. In the present embodiment, the head-side engaging portion 30 axially protrudes from the other end of the nozzle head 12, and is formed in an arc form when axially viewed. The head-side engaging portion 30 is formed at such a position that it does not overlap with the straight line A4. In the present embodiment, the head-side engaging portion 30 is arranged such that the part corresponding to the chord of the arc form is parallel with the straight line A4. Therefore, when the nozzle head 12 and the valve block 10 are butted each other at a predetermined position, the head-side engaging portion 30 fits and engages with the block-side engaging portion 34.

Fastening Member

The fastening member 13 is a member that fastens the nozzle head 12 to the valve block 10 (more specifically, the plug portion 21). The fastening member 13 is, for example, a bolt. The fastening member 13 inserts an intermediate part thereof through the insertion portion 39*a* in a state that the nozzle head 12 and the valve block 10 are butted each other at a predetermined position. The fastening member 13 has a screw portion 13*a* in a distal end part thereof. The fastening member 13 screws the screw portion 13*a* with the fastening hole 33. A head portion 13*b* of the fastening member 13 is seated around the opening of the insertion portion 39*a*. Thus, the nozzle head 12 is sandwiched between the fastening member 13 and the plug portion 21. Thus, the nozzle head 12 is fixed to the valve block 10.

The fastening member 13 fastens the nozzle head 12 and the valve block 10 as follows. That is, the fastening member 13 is placed into the counterbore portion 39*b* from a lateral side of the nozzle head 12. Then, the screw portion 13*a* on the distal end side of the fastening member 13 is inserted into the insertion portion 39*a*. Then, the fastening member 13 is pushed forward until the screw portion 13*a* reaches the fastening hole 33 of the plug portion 21. After the screw portion 13*a* has reaches the fastening hole 33, the fastening member 13 is screwed by the screw portion 13*a* with the fastening hole 33. Since the fastening member 13 can be placed into the counterbore portion 39*b* from the lateral side of the nozzle head 12, it is possible to shorten the length of the insertion portion 39*a*. Therefore, it is possible to suppress the torque acting on the fastening member 13 when the nozzle head 12 and the valve block 10 are relatively displaced, for example, by reception of force from fluid or the like.

Temperature Sensor

The temperature sensor 14 measures fluid temperature in the tank 2. The temperature sensor 14 is a member that is longer than the sensor insertion hole 37 and has a temperature detecting portion 14*a* in a distal end part thereof. The temperature detecting portion 14*a* is a portion that measures fluid temperature in the tank 2. The temperature sensor 14 is inserted through the sensor insertion hole 37 from one end of the nozzle head 12 (namely, distal end of the nozzle head 12), namely from the insertion port 37*a*. Thus, the filling and supplying line 38, the temperature sensor 14, and the fastening member 13 are arranged to form a triangle in a cross section of the nozzle head 12 cut perpendicularly to the axial direction. In the present embodiment, the proximal end part of the temperature sensor 14 is formed to have the same diameter as the sensor insertion hole 37. Therefore, when the temperature sensor 14 is inserted from the insertion port 37*b*, the temperature sensor 14 is fitted with the nozzle head 12. Thus, the temperature sensor 14 is fixed to the nozzle head 12 by being inserted from the insertion port 37*b*. It is to be noted that a snap fit may be formed in the proximal end part of the temperature sensor 14, and the temperature sensor 14 may be fixed to the sensor insertion hole 37 by the snap fit. The temperature sensor 14 protrudes the distal end side where the temperature detecting portion 14*a* is formed from one end of the nozzle head 12. Accordingly, it is possible to arrange the temperature detecting portion 14*a* further inward in the tank 2. Thus, the temperature of fluid in the tank 2 is measured more accurately. That is, by protruding at least a part of the temperature detecting portion 14*a*, the fluid around the temperature detecting portion 14*a* convects. Thus, it is possible to improve the measurement accuracy of the temperature of fluid in the tank 2. However, the temperature detecting portion 14*a* does not necessarily protrude from one end of the nozzle head 12. The temperature sensor 14 has a connector 14*b* in the end part opposite to the temperature detecting portion 14*a*, namely, in the proximal end part. In the present embodiment, the temperature sensor 14 has a female connector in the proximal end part.

Hermetic Terminal

The hermetic terminal 15 has a main body portion 15*a*, a plurality of terminal portions 15*b*, and a seal portion 15*c*. The hermetic terminal 15 electrically connects the temperature sensor 14 and the wiring 16 as shown in FIG. 2. The hermetic terminal 15 closes the wiring passage 10*b* hermetically. In the present embodiment, the hermetic terminal 15 is arranged between the valve block 10 and the nozzle head 12, and pushed against the valve block 10 by the nozzle head 12 to close the wiring passage 10*b*. More specifically, the hermetic terminal 15 is accommodated in the accommodating portion 32*a* of the plug-side passage 32.

The main body portion 15*a* is pushed against the valve block 10 to close the wiring passage 10*b*. More specifically, one end side part in the axial direction of the main body portion 15*a* is inserted through the connection port 37*a* of the sensor insertion hole 37, and the other end is brought into contact with the step portion 37*c*. The other end side part in the axial direction of the main body portion 15*a* is formed to have the same diameter with the communicating portion 32*b* of the plug-side passage 32. The other end part in the axial direction of the main body portion 15*a* is inserted through the communicating portion 32*b* of the plug-side passage 32. Further, an intermediate part of the main body portion 15*a* is formed to have a larger diameter than the one end side part and the other end side part in the axial direction. The intermediate part of the main body portion 15*a* is seated on the seating portion 32*c*. Therefore, the intermediate part of the main body portion 15*a* is pushed against the seating portion 32*c* by pushing of one end of the main body portion 15*a* by the step portion 37*c*. Thus, the wiring passage 10*b* is closed by the main body portion 15*a*, and the fluid in the tank 2 is prevented from flowing out to the wiring passage 10*b*.

The plurality of terminal portions 15*b* are thin rod-shaped conductive wires, and, for example, core metal. In the present embodiment, the hermetic terminal 15 has two terminal portions 15*b*. The two terminal portions 15*b* penetrate the main body portion 15*a* in the axial direction in a state that they are spaced from each other. One end parts in the axial direction of the two terminal portions 15*b* are inserted through the connector 14*b* of the temperature sensor 14. The other end parts in the axial direction of the two terminal portions 15*b* are inserted into the wiring 16 described later. Thus, the two terminal portions 15*b* are electrically connected to the temperature sensor 14 and the wiring 16.

The seal portion 15*c* is externally mounted on one end side part of the main body portion 15*a*. The seal portion 15*c* hermetically seals between the main body portion 15*a* and the inner peripheral surface of the plug portion 21. In the present embodiment, the seal portion 15*c* is an O-ring.

Wiring

The wiring 16 is electrically connected to the temperature sensor 14 via the hermetic terminal 15. More specifically, the wiring 16 has a connector in one end part. As described above, through one end part of the wiring 16, the other end parts in the axial direction of the two terminal portions 15*b* of the hermetic terminal 15 are inserted. The wiring 16 is electrically connected to external wiring inserted from an extraction port (not shown). Thus, it is possible to extract a signal to outside the tank 2 from the temperature sensor 14 arranged inside the tank 2.

The tank valve device 1 configured as described above is inserted through the opening 2*a* of the tank 2 as described above. In the tank valve device 1, when fluid is supplied from the inlet/outlet (not shown), the valve body of the electromagnetic valve 11 is moved by the fluid. Thus, the flow channel 10*a* is open, and fluid is filled into the tank 2 through the filling and supplying line 38. In the case of delivering fluid in the tank 2 after filling, a signal is input to the solenoid of the solenoid valve 11. This makes the valve body move to open the flow channel 10*a*. Thus, the fluid in the tank 2 is guided to the inlet/outlet through the filling and supplying line 38 and the flow channel 10*a*. The fluid is then delivered from the inlet/outlet. Thus, it is possible to supply fluid to an external consuming device (such as a gas engine and a fuel cell) connected to the inlet/outlet. In the tank valve device 1, the temperature detecting portion 14*a* of the temperature sensor 14 measures the temperature of fluid in the tank 2. Then, a signal corresponding to the measured temperature is output to the external device via the hermetic terminal 15 and the wiring 16.

In the tank valve device 1 having such a function, the temperature sensor 14 is incorporated into the nozzle head 12 in which the filling and supplying line 38 is formed. Therefore, it is possible to prevent the number of parts of the tank valve device 1 from increasing. In the tank valve device 1, the ejection port 38*b* is oriented to the direction away from the sensor insertion hole 37. That is, the ejection port 38*b* is oriented to the direction away from the temperature sensor 14. Therefore, it is possible to prevent the fluid ejected to the tank 2 from directly coming into contact with the temperature sensor 14. Thus, it is possible to improve the measurement accuracy of the temperature of fluid in the tank 2.

Further, in the tank valve device 1, the ejection port 38*b* is formed on the lateral surface of the nozzle head 12. In the present embodiment, the ejection port 38*b* is formed on the cut-out surface 12*a* of the nozzle head 12. Therefore, it is possible to design the filling and supplying line 38 to fall within the outer dimension of the nozzle head 12 while preventing the fluid to be filled from being ejected to the temperature sensor 14. Thus, it is possible to achieve both improvement in measurement accuracy of the temperature of fluid, and prevention of increase in diameter of the nozzle head 12.

In the tank valve device 1, the temperature sensor 14 is inserted through the sensor insertion hole 37 from the insertion port 37*a*. Therefore, it is possible to assemble the temperature sensor 14 to the nozzle head 12 by inserting the temperature sensor 14 from the distal end side of the nozzle head 12. Therefore, it is easy to assemble the temperature sensor 14 to the nozzle head 12.

Figure 5:
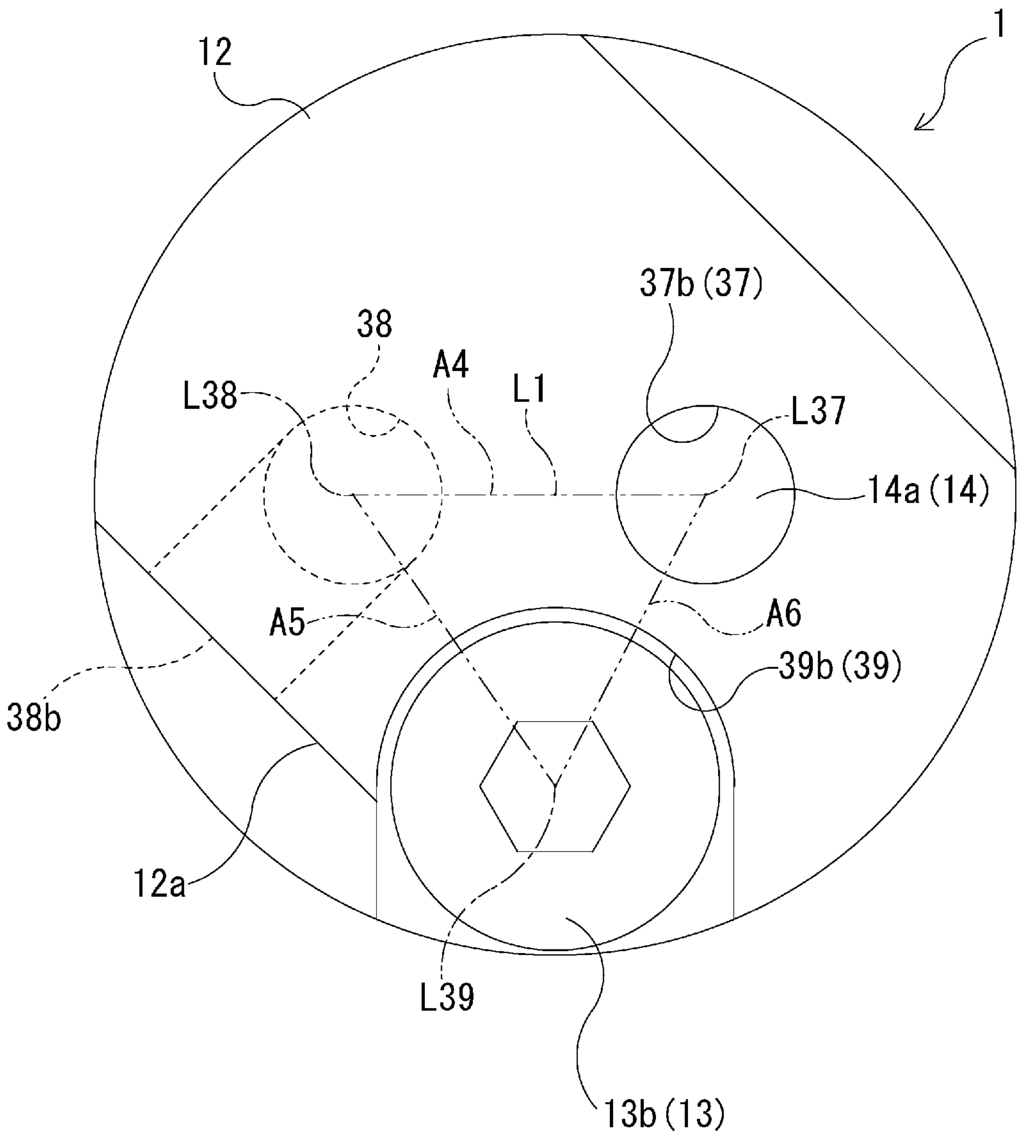
FIG. 5 is a bottom view of a distal end of a nozzle head of FIG. 1 viewed axially.

In the tank valve device 1, as shown in FIG. 3, straight lines A5 to A6 each intersecting with the respective axial lines L37 to L39 of the sensor insertion hole 37, the filling and supplying line 38, and the fastening member insertion hole 39 form a triangle in a cross section cut perpendicularly to the axial line L1. That is, the sensor insertion hole 37, the filling and supplying line 38, and the fastening member insertion hole 39 form a triangle in the cross section cut perpendicularly to the axial line L1. The fastening member 13 is inserted through the fastening member insertion hole 39, and the temperature sensor 14 is inserted through the sensor insertion hole 37. Therefore, the filling and supplying line 38, the temperature sensor 14, and the fastening member 13 are arranged to form a triangle in a cross section of the nozzle head 12 cut perpendicularly to the axial direction (see also FIG. 5 viewed from the distal end of the head nozzle 12). Therefore, it is possible to prevent the filling and supplying line 38, the temperature sensor 14, and the fastening member 13 from aligning in line. Thus, it is possible to sufficiently ensure the flow channel area of the filling and supplying line 38.

In the tank valve device 1, by engagement between the block-side engaging portion 34 and the head-side engaging portion 30, it is possible to prevent the nozzle head 12 from rotating about the fastening member 13 with respect to the valve block 10. Thus, it is possible to prevent the load from acting on the temperature sensor 14 by rotation of the nozzle head 12 with respect to the valve block 10. In the tank valve device 1, since the sensor insertion hole 37 is linearly formed, it is possible to easily insert the temperature sensor 14 through the sensor insertion hole 37. Therefore, it is easy to assemble the temperature sensor 14 to the nozzle head 12. Further, since most of the temperature sensor 14 can be placed in the nozzle head 12, no load is exerted from the fluid.

Further, in the tank valve device 1, the nozzle head 12 is longer than the plug portion 21. Therefore, it is possible to arrange the temperature sensor 14 further inward in the tank 2. Thus, it is possible to measure the temperature of fluid in a stable state in the tank 2. In the tank valve device 1, the valve block 10 and the nozzle head 12 are separately formed. Therefore, it is easy to treat the wiring of the temperature sensor 14.

Embodiment 2

The tank valve device 1A of Embodiment 2 resembles the tank valve device 1 of Embodiment 1 in configuration. Therefore, the configuration of the tank valve device 1A of Embodiment 2 is described mainly about the point different from that of the tank valve device 1 of Embodiment 1, and the same configuration is denoted by the same reference numeral, and the description is omitted.

Figure 6:
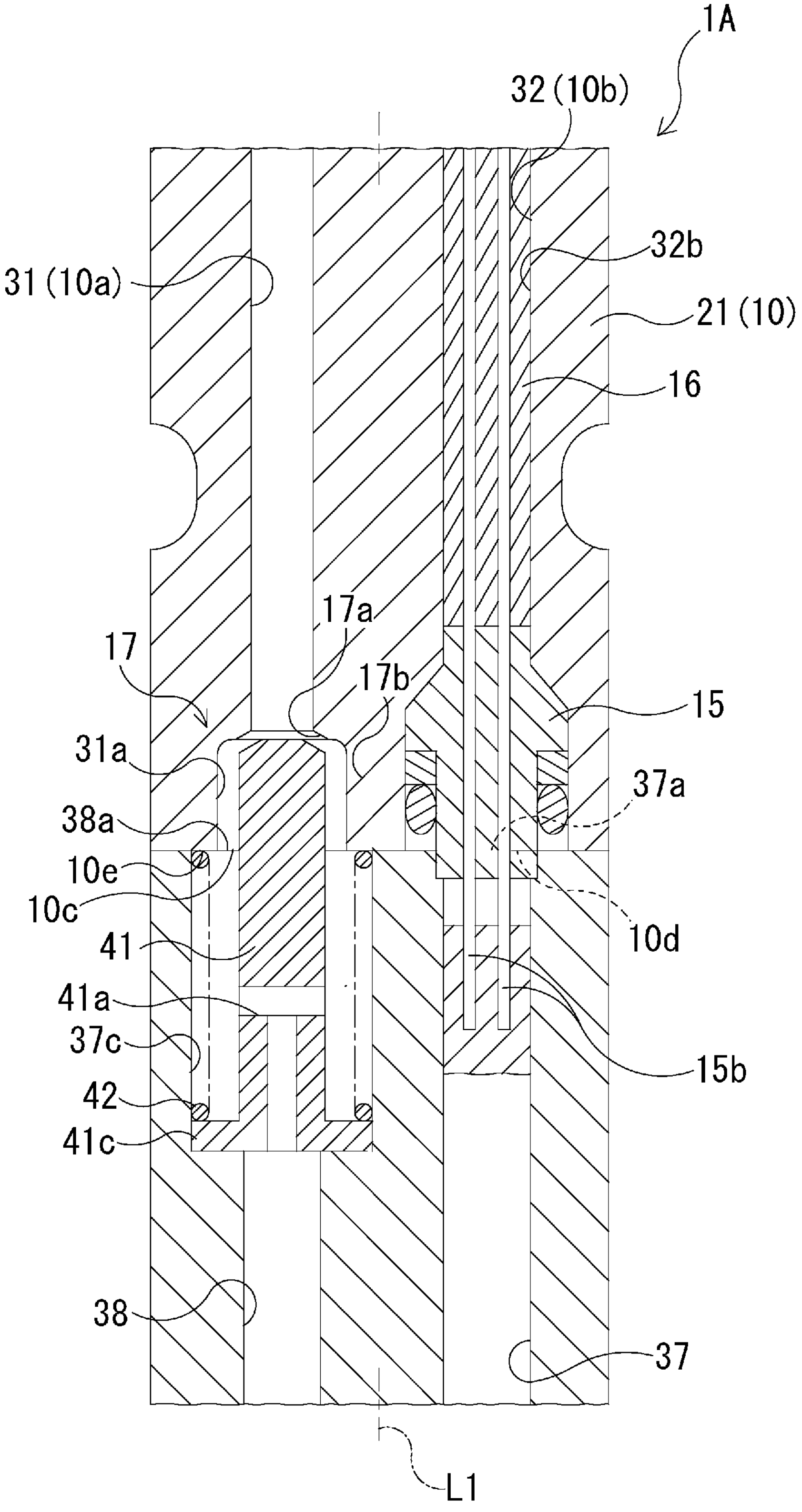
FIG. 6 is an enlarged sectional view showing in enlargement a part of the tank valve device of Embodiment 2 of the present invention.

As shown in FIG. 6, the tank valve device 1A further includes a valve 17 (excess flow valve in the present embodiment). The excess flow valve 17 has a piston 41 and a spring member 42. The excess flow valve 17 is provided in the nozzle head 12. The excess flow valve 17 controls the flow of fluid delivered from inside the tank 2. The excess flow valve 17 closes the flow channel 10*a* when the flow rate of the fluid delivered from inside the tank 2 exceeds a predetermined flow rate. Specifically, the excess flow valve 17 is provided in the filling and supplying line 38 and the plug-side flow channel 31. Also, the plug-side flow channel 31 has a valve seat 17*a* between a large-diameter part 31*a* and a part leading to the same. Around the communication port 10*c*, a spring receiving portion 10*e* is formed. In the present embodiment, the communication port 38*a* of the filling and supplying line 38 is formed to have a larger diameter than the communication port 10*c* of the valve block 10. The spring member 42 is arranged in the part having a large diameter, and the circumference of the communication port 10*c* is the spring receiving portion 10*e*. The piston 41 can seat a distal end part thereof on the valve seat 17*a*. The piston 41 moves between a closed position where it is seated on the valve seat 17*a* and an open position where it is separate from the valve seat 17*a*. In the piston 41, a flow channel 41*a* is formed. The flow channel 41*a* connects the front and the back of the piston 41. The fluid flowing in front of and on the back of the piston 41 moves back and forth through the flow channel 41*a*. Further, the piston 41 has a spring receiving seat 41*c* in a proximal end part. The spring receiving seat 41*c* is opposed to the spring receiving portion 10*e* located around the communication port 10*c*.

The spring member 42 biases the piston 41 so as to separate it from the valve seat 17*a*. That is, the spring member 42 biases the piston 41 to the open position. More specifically, the spring member 42 is arranged in a compressed state between the spring receiving portion 10*e* and the spring receiving seat 41*c*.

In the excess flow valve 17 configured as described above, the piston 41 is pushed to the open position by the fluid during filling. Therefore, the flow channel 10*a* is opened. On the other hand, during supply, when the flow rate of the fluid flowing from the filling and supplying line 38 to the flow channel 10*a* reaches a predetermined flow rate, the piston 41 moves toward the valve seat 17*a* against the biasing force by the load receiving from the fluid. Then, the piston 41 is seated on the valve seat 17*a*. That is, the flow channel 10*a* is closed. Thus, the excess flow valve 17 limits the flow rate flowing from the filling and supplying line 38 to the flow channel 10*a* to a predetermined flow rate or less. This prevents delivery of fluid of an excess flow rate from the filling and supplying line 38.

The tank valve device 1A of Embodiment 2 achieves the equivalent operation and effect as the tank valve device 1 of Embodiment 1.

OTHER EMBODIMENTS

In the tank valve devices 1, 1A of Embodiment 1 and Embodiment 2, the valve block 10 and the nozzle head 12 are fastened by the fastening member 13, however, the method for fixing the valve block 10 and the nozzle head 12 is not limited to this. For example, the valve block 10 and the nozzle head 12 may be fixed by welding, friction stir welding, or snap fit. Even with the fastening member 13, the fastening member 13 is not necessarily inserted in the axial direction as in the tank valve device 1 of the present embodiment, but may be inserted, for example, in the radial direction that intersects with the axial direction to fasten the valve block 10 and the nozzle head 12. The position of the fastening member 13 is not limited to a position deviated from the axial line L1, but may be arranged along the axial line L1.

In the tank valve devices 1, 1A, the configuration of preventing rotation of the nozzle head 12 about the fastening member 13 is not necessarily a structure as described above, and, for example, one of the engaging portions 30 and 34 may be a pin. In the case of a pin, a fitting hole is provided in both of the nozzle head 12 and the valve block 10, and by fitting the pin in respective fitting holes, rotation of the nozzle head 12 about the fastening member 13 can be prevented. That is, the other engaging portions 34, 30 are formed as fitting holes.

In the tank valve devices 1, 1A of Embodiment 1 and Embodiment 2, the filling and supplying line 38 capable of both filling of fluid and delivering of fluid is not necessarily formed. That is, a filling line for filling the fluid into the tank 2 and a supplying line for delivering the fluid from the tank 2 may be formed separately in the nozzle head 12. In this case, the excess flow valve 17 may be provided in the filling line, and the check valve may be provided in the supplying line. By commonly providing the filling line and the supplying line as with the filling and supplying line 38 in the tank valve device 1 of the present embodiment, it is possible to miniaturize the valve block 10, and more particularly it is possible to miniaturize the plug portion 21. Furthermore, the flow channel 10*a* leading to the filling and supplying line 38 may be branched along the way into a filling flow channel and a supplying flow channel. In this case, the supplying flow channel is provided with the electromagnetic valve, and the filling flow channel is provided with the check valve. The electromagnetic valve controls the flow channel of the fluid discharged from the tank 2, and the check valve prevents discharge of fluid from the tank 2.

Furthermore, while the filling and supplying line 38, the temperature sensor 14, and the fastening member 13 are arranged in a triangle in the cross section cut on a virtual plane perpendicular to the axial line L1 in the present embodiment, the arrangement is not necessarily limited to this. The filling and supplying line 38, the temperature sensor 14, and the fastening member 13 may be arranged, for example, linearly in the above-described cross section.

Also, the hermetic terminal 15 is not limited to the shape as described above. That is, the hermetic terminal 15 only has to be configured to be able to close the wiring passage 10*b*.

Figure 7:
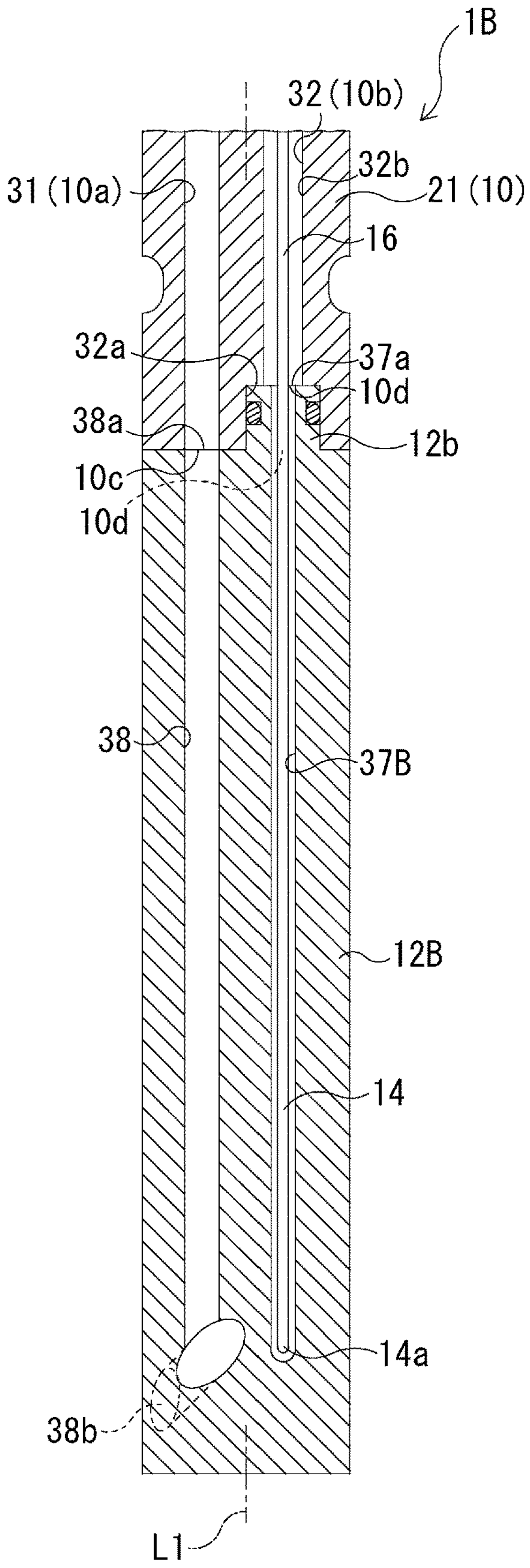
FIG. 7 is an enlarged sectional view showing in enlargement a part of the tank valve device of other embodiment of the present invention.

Also, the hermetic terminal 15 is not necessarily provided. When the hermetic terminal 15 is not provided, a seal may be provided between the valve block 10 and the nozzle head 12. For example, a nozzle head 12B of a tank valve device 1B may be formed as shown in FIG. 7. In FIG. 7, a bottomed sensor insertion hole 37B is provided in the nozzle head 12B. Through the sensor insertion hole 37B, the temperature sensor 14 is inserted. In the vicinity of the bottom part of the sensor insertion hole 37, the temperature detecting portion 14*a* of the temperature sensor 14 is arranged. The nozzle head 12B has a protruding portion 12*b* in the other end part. The protruding portion 12*b* is inserted and fitted into the accommodating portion 32*a* of the plug-side passage 32. The protruding portion 12*b* is formed around the sensor insertion hole 37B, and on the end surface of the protruding portion 12*b*, the connection port 37*a* of the sensor insertion hole 37B is formed. Around the protruding portion 12*b*, a seal is provided. Thus, the sensor insertion hole 37B and the wiring passage 10*b* are connected hermetically. In the tank valve device 1B, the wiring passage 10*b* and the sensor insertion hole 37B are separated from the interior space of the tank 2 by the nozzle head 12B. Therefore, it is possible to prevent fluid in the tank 2 from leaking outside through the wiring passage 10*b* and the sensor insertion hole 37.

The valve 17 is not limited to an excess flow valve. For example, the valve 17 may be a check valve. The structure of the excess flow valve 17 is not limited to the embodiment, and may be other structure. Further, the valve 17 may be provided in the valve block 10 without limited to the nozzle head 12.

Various modifications and other embodiments of the present invention will be apparent to those skilled in the art from the above description. Accordingly, the above description should be interpreted merely as illustration, and is provided for the purpose of indicating the best mode for carrying out the present invention to those skilled in the art. The details of the structure and/or the function can be substantially changed without departing from the spirit of the present invention.

The invention claimed is:

1. A tank valve device comprising:
- a valve block provided in an opening of a tank;
- a valve that is attached to the valve block;
- a nozzle head in the shape of a cylinder that extends along an axial line and is attached to the valve block and arranged inside the tank;
- a temperature sensor that measures fluid temperature in the tank, and
- a fastener that fastens the nozzle head to the valve block, wherein
- the nozzle head includes: a filling and supplying line that flows fluid to be filled into the tank and is capable of delivering fluid in the tank; a sensor insertion hole through which the temperature sensor is inserted; and one fastener insertion hole through which the fastener is inserted, the filling and supplying line, the sensor insertion hole, and the one fastener insertion hole are formed in a cross section of the cylinder of the nozzle head, the nozzle head has a head-side engaging portion, the valve block has a block-side engaging portion, and the block-side engaging portion prevents the nozzle head from rotating about the fastener by engaging with the head-side engaging portion.

2. The tank valve device according to claim 1, wherein the filling and supplying line has an ejection port that ejects fluid to the tank, and the ejection port is oriented to the direction away from the temperature sensor.

3. The tank valve device according to claim 2, wherein the ejection port is formed on a lateral surface of the nozzle head.

4. The tank valve device according to claim 1, wherein the temperature sensor has a temperature detecting portion in a distal end part of the temperature sensor, and a distal end of the temperature sensor is protruded from a distal end of the nozzle head.

5. The tank valve device according to claim 1, wherein the nozzle head extends in a predetermined direction, and the filling and supplying line, the temperature sensor, and the fastener are arranged to form a triangle in a cross section of the nozzle head cut perpendicularly to the axial line.

6. The tank valve device according to claim 1, wherein the valve block has a plug that is inserted into the opening of the tank, and a block body that is arranged outside the tank, and the nozzle head is longer than the plug.

7. The tank valve device according to claim 1, further comprising a hermetic terminal that electrically connects wiring provided in the valve block and the temperature sensor, wherein the valve block has a wiring passage through which the wiring is inserted, and the hermetic terminal is arranged between the valve block and the nozzle head, and pushed against the valve block to close the wiring passage.

8. The tank valve device according to claim 1, further comprising a valve that controls flow of fluid delivered from inside the tank, wherein the valve is provided in the nozzle head.

* * * * *